(12) United States Patent
Ruellan et al.

(10) Patent No.: US 8,972,851 B2
(45) Date of Patent: Mar. 3, 2015

(54) METHOD OF CODING OR DECODING A STRUCTURED DOCUMENT BY MEANS OF AN XML SCHEMA, AND THE ASSOCIATED DEVICE AND DATA STRUCTURE

(75) Inventors: Herve Ruellan, Rennes (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 12/726,443

(22) Filed: Mar. 18, 2010

(65) Prior Publication Data

US 2010/0241949 A1   Sep. 23, 2010

(30) Foreign Application Priority Data

Mar. 18, 2009   (FR) ...................................... 09 51719

(51) Int. Cl.
*G06F 17/00* (2006.01)
*G06F 17/22* (2006.01)

(52) U.S. Cl.
CPC .................................. *G06F 17/2247* (2013.01)
USPC ............ 715/234; 715/227; 715/236; 715/242

(58) Field of Classification Search
USPC .................................. 715/234, 236, 227, 242
See application file for complete search history.

(56) References Cited

U.S. PATENT DOCUMENTS

| | | | |
|---|---|---|---|
| 6,606,620 B1 * | 8/2003 | Sundaresan et al. ................... | 1/1 |
| 7,080,318 B2 * | 7/2006 | Devillers ....................... | 715/234 |
| 7,158,990 B1 * | 1/2007 | Guo et al. .............................. | 1/1 |
| 7,590,644 B2 * | 9/2009 | Matsakis et al. ...................... | 1/1 |
| 7,647,552 B2 * | 1/2010 | Wan ............................... | 715/234 |
| 7,925,643 B2 * | 4/2011 | Balegar et al. ................. | 707/713 |
| 2003/0018466 A1 | 1/2003 | Imaura ............................... | 704/6 |
| 2003/0177443 A1 * | 9/2003 | Schnelle et al. ............... | 715/513 |
| 2003/0196168 A1 * | 10/2003 | Hu .................................... | 715/513 |
| 2004/0003343 A1 * | 1/2004 | Liao et al. .................... | 715/501.1 |
| 2004/0068696 A1 * | 4/2004 | Seyrat et al. ................... | 715/513 |
| 2004/0107402 A1 * | 6/2004 | Seyrat et al. ................... | 715/513 |
| 2006/0212800 A1 * | 9/2006 | Kamiya ......................... | 715/513 |
| 2008/0021916 A1 * | 1/2008 | Schnelle et al. ............... | 707/101 |
| 2008/0098029 A1 | 4/2008 | Ruellan ......................... | 707/102 |
| 2008/0120608 A1 * | 5/2008 | Shetty et al. .................. | 717/144 |
| 2008/0140645 A1 | 6/2008 | Denoual ........................... | 707/5 |

(Continued)

OTHER PUBLICATIONS

League, C., et al., "Type-Based Compression of XML Data", Data Compression Conference 2007 (DCC '07), pp. 273-282 (2007).

(Continued)

*Primary Examiner* — Stephen Hong
*Assistant Examiner* — Marshon Robinson
(74) *Attorney, Agent, or Firm* — Fitzpatrick, Cella, Harper & Scinto

(57) ABSTRACT

The present invention concerns a method and device for coding or decoding a structured document, for example an XML document, using a structure-describing file of the XML Schema type.

The method comprises a step of configuring an encoder or decoder including the obtaining of data describing a document structure model and their storage in the form of recordings, and a step of calculating a number of items, referred to as "possible items", able to succeed, according to the structure model, an item of said model, said number of possible items being stored in a recording associated with said item.

In order to facilitate calculations, the recordings comprise the minimum and maximum numbers of occurrences of the item defined by the structure model.

17 Claims, 9 Drawing Sheets

(56) References Cited

U.S. PATENT DOCUMENTS

| | | | |
|---|---|---|---|
| 2008/0250055 A1 | 10/2008 | Ruellan et al. | 707/102 |
| 2008/0320031 A1 | 12/2008 | Denoual | 707/102 |
| 2009/0235185 A1* | 9/2009 | Gill | 715/760 |
| 2009/0254882 A1 | 10/2009 | Ruellan | 717/120 |
| 2010/0001886 A1 | 1/2010 | Bellessort et al. | 341/51 |
| 2010/0010995 A1 | 1/2010 | Fablet et al. | 707/6 |
| 2010/0083101 A1* | 4/2010 | Denoual et al. | 715/242 |
| 2010/0115397 A1 | 5/2010 | Bellessort et al. | 715/234 |

OTHER PUBLICATIONS

Toman, V., et al., "Syntactical Compression of XML Data", In Proc. Int'l Conf. on Advanced Information Systems, Caise, pp. 1-12 (2004).

Schneider, J., et al., "Efficient XML Interchange (EXI) Format 1.0", W3C Working Draft Jul. 16, 2007.

Ng. W., et al., "Comparative Analysis of XML Compression Technologies", Internet and Web Information Systems, vol. 9, No. 1, pp. 5-33 (2006).

* cited by examiner

```
<xs:element name="person">
  <xs:complexType>
    <xs:sequence>
      <xs:element name="name"/>
      <xs:element name="address" minOccurs="1" maxOccurs="unbounded"/>
      <xs:element name="phone" minOccurs="0" maxOccurs="unbounded"/>
    </xs:sequence>
  </xs:complexType>
</xs:element>
```

Figure 1

```
person_0:
    SE (name)      person_1      0 person_1:
    SE (address)   person_2      0 person_2:
    SE (address)   person_2      0
    SE (phone)     person_3      1
    EE                           2 person_3:
    SE (phone)     person_3      0
    EE                           1
```

Figure 2

| | | |
|---|---|---|
| (21') SE (name) | 1 | 1 |
| (22') SE (address) | 1 | Infinite |
| (23') SE (phone) | 0 | Infinite |
| (24') EE | | |

Figure 3a

| | | | |
|---|---|---|---|
| (21') SE (name) | 1 | 1 | 1 |
| (22') SE (address) | 1 | Infinite | 3 |
| (23') SE (phone) | 0 | Infinite | 2 |
| (24') EE | | | |

Figure 3b

```
document_0:
    SE (title) document_1                0 document_1:
    SE (subtitle) document_2             0
    SE (abstract) document_2             1
    SE (paragraph) document_3            2 document_2:
    SE (paragraph) document_3            0 document_3:
    SE (paragraph) document_3            0
    SE (note) document_4                 1
    SE (title) document_1                2
    EE                                   3 document_4:
    SE (title) document_1                0
    EE                                   1
``` with labels $10_0$, $10_1$, $10_2$, $10_3$, $10_4$ for each document block.

| Type of event 30 | Min 31 | Max 32 |
|---|---|---|
| Start sequence (21) | 1 | Infinite |
| SE (title) (22) | 1 | 1 |
| Start choice (23) | 1 | 1 |
| SE (subtitle) (24) | 0 | 1 |
| SE (abstract) (25) | 0 | 1 |
| End choice (26) | | |
| SE (paragraph) (27) | 1 | Infinite |
| SE (note) (28) | 0 | 1 |
| End sequence (29) | | |
| EE | | |

Figure 8a

| Type of event 30 | Min 31 | Max 32 | Poss 33 | End group 34 |
|---|---|---|---|---|
| Start sequence (21) | 1 | Infinite | | |
| SE (title) (22) | 1 | 1 | 1 | No |
| Start choice (23) | 1 | 1 | | |
| SE (subtitle) (24) | 0 | 1 | | |
| SE (abstract) (25) | 0 | 1 | | |
| End choice (26) | | | | No |
| SE (paragraph) (27) | 1 | Infinite | 2 | Yes |
| SE (note) (28) | 0 | 1 | 1 | Yes |
| End sequence (29) | | | | |
| EE | | | | |

Figure 8b

| Type of event 30 | Min 31 | Max 32 | Poss 33 | End group 34 | Ind group 35 | In group 36 | Aftergroup 34 | Trav 38 |
|---|---|---|---|---|---|---|---|---|
| Start sequence (21) | 1 | Infinite | | | | 1 | 1 | No |
| SE (title) (22) | 1 | 1 | 1 | No | 1 | | | |
| Start choice (23) | 1 | 1 | | | NA | 2 | 1 | Yes |
| SE (subtitle) (24) | 0 | 1 | | | | | | |
| SE (abstract) (25) | 0 | 1 | | | | | | |
| End choice (26) | | | | No | | | | |
| SE (paragraph) (27) | 1 | Infinite | 2 | Yes | NA | | | |
| SE (note) (28) | 0 | 1 | 1 | Yes | NA | | | |
| End sequence (29) | | | | | | | | |
| EE | | | | | | | | |

Figure 8c

METHOD OF CODING OR DECODING A STRUCTURED DOCUMENT BY MEANS OF AN XML SCHEMA, AND THE ASSOCIATED DEVICE AND DATA STRUCTURE

The present invention concerns a method and device for coding or decoding a structured document, for example a structured document of the XML type ("Extensible Markup Language").

BACKGROUND OF THE INVENTION

The XML format is a syntax for defining computer languages, which makes it possible to create languages adapted to different uses that can however be processed by the same tools.

An XML document is composed of elements, each element beginning with an opening tag comprising the name of the element (for example: <tag>) and ending in a closing tag also comprising the name of the element (for example: </tag>). Each element can contain other elements or text data.

An element can also be specified by attributes, each attribute being defined by a name and having a value. The attributes are then placed in the opening tag of the element that they specify (for example: <tag attribute="value">).

XML syntax also makes it possible to define comments (for example: "<!--Comment-->") and processing instructions, which may specify to a computer application which processing operations to apply to the XML document (for example ("<?myprocessing?>").

In XML terminology, all the terms "element", "attribute", "text data", "comment", "processing instruction" and "escape section" are grouped together under the generic term "item". In a more general context, all these terms (forming for example the element defined between an opening tag and a closing tag) can be grouped together under the generic term "node".

To process an XML document, the latter must be read in memory. Two families of methods of reading an XML document exist.

The first family of methods consists of representing the entire XML document in memory, in the form of a tree. These methods afford easy and rapid access to any node or any part of the XML document, but require a large amount of memory space. One example of these methods is the DOM ("Document Object Model") programming interface.

A second family of methods consists of representing each node of the XML document by one or more events. The entire XML document is then described by the succession of these events. These methods make it possible to process an XML document as it is read (streaming mode).

One advantage of these methods lies in the small amount of memory space that they require for processing a document. Nevertheless they require navigation in the document solely in the order of reading it. Examples of these methods are the SAX ("Simple API for XML") and StAX ("Streaming API for XML") programming interfaces.

The XML format has many advantages and has become a standard for storing data in a file or for exchanging data. First of all, the XML format makes it possible in particular to have available numerous tools for processing the files generated. Also, an XML document can be edited manually with a simple text editor. In addition, as an XML document contains its structure integrated in the data, this document is highly legible even without knowing its specification.

Nevertheless, the main drawback of XML syntax is being very prolix. Thus the size of an XML document may be several times greater than the intrinsic size of the data. This large size of the XML document also gives rise to a long processing time during the generation and in particular the reading of XML documents.

To mitigate these drawbacks, mechanisms have been put in place, the purpose of which is to code the content of the XML document in a more effective form, making it possible to reconstruct the XML document easily. However, the majority of these mechanisms do not keep all the advantages of the XML format. There exist nevertheless new formats that make it possible to store the data contained in an XML document. These various formats are grouped together under the term "Binary XML".

Among these formats, EXI ("Efficient XML Interchange") is currently being standardized by the W3C ("World Wide Web Consortium", an organization producing standards for the web) and makes it possible to code an XML document in a binary form.

This format uses dictionaries for coding the various parts of an XML document.

Some of these dictionaries are said to be "global" in that they concern the coding of the whole of the document, such as for example the vocabulary dictionary for coding URIs ("Uniform Resource Identifiers") or the global dictionary of values.

Other dictionaries are said to be "local": for example, a vocabulary dictionary for the element local names is associated with each URI. In a similar manner, a dictionary of values is associated with each attribute qualified name. A local dictionary is thus used solely when the URI, the attribute qualified name, etc, associated with the dictionary concerns the portion of XML document to be coded. This local dictionary used is, at this time of use, the current dictionary of values.

Finally, dictionaries of local structures are also used for coding the structure of the XML document. These dictionaries make it possible to code the type of each item of the XML document: attribute, element opening tag, etc. These dictionaries of structures depend on the parent element of the item to be coded and may depend on the items preceding the item to be coded within this parent element. These dictionaries of structures are generally called "grammars" in the EXI specification.

Still according to the latter, the grammars are composed of a set of productions, each production comprising an XML event description, an associated coding value and the indication of the following grammar to be used (for coding the following event). Since one grammar is passed to from another by virtue of this indication, at a given moment in the coding or decoding processing operations according to the EXI specification, there is generally only one current grammar.

A grammar according to EXI may evolve. In a certain number of cases, after the occurrence of an XML event already described by a production of the grammar (if it is not described by a production, it cannot be encoded by the grammar), the grammar is modified in order to include a new production corresponding to this XML event. This production can either contain a more precise description of the event, reducing the number of items of information to be coded in order to represent the event, or have a more compact coding value.

The coding values or "numerical codes", are expressed in the form of "priorities" generally having between 1 and 3 levels. Coding a coding value amounts to coding the values of its priority. According to the most advantageous coding mode in terms of compression, each level is coded in a minimum number of bits in order to be able to code the largest value of this level associated with a production of the grammar. For example, for a level taking values from 0 to 6, 3 coding bits are used.

In the remainder of the description, the term "dictionary" is used to designate generically the various dictionaries used during the coding or decoding of a document: vocabulary dictionary, dictionary of values or dictionary of structures.

Although the remainder of the description concentrates on the EXI format, as above, since the invention is particularly well suited to this format, the invention is not limited to this coding format. The invention can also apply to other binary XML formats, or be used between several binary XML formats.

By way of example, the Fast Infoset format, a binary ITU-T and ISO format, uses in particular binary indicators for describing the various nodes contained in the XML document, as well as index tables (dictionaries according to the terminology adopted above) for the names of elements, the names of attributes, the values of attributes and the text values.

In order to be above to adapt to different scenarios, the coding formats, and in particular the EXI format, propose several coding options.

Thus, for example, the local structure dictionaries can be created either dynamically during the coding of the document (or during its decoding) or in advance from a document structural description file (referred to as XML Schema).

The same applies for the dictionaries of local names of elements which are either created dynamically during the coding of the document or filled in, in advance, from an XML Schema.

XML Schemas are also the subject of a specification of the W3C and are provided for describing the structure of a family of XML documents. This description is itself produced in XML language.

This specification is divided into two parts, a first that corresponds to the description of the structure of an XML document and a second that corresponds to the description of the types of data that can be used for the contents of an XML document.

Thus an XML Schema makes it possible to describe the structure of an XML document by defining its name, the list of its attributes and their respective types, and the content of this element. This content can be composed of text, other elements/items or a mixture of the two.

The other elements are organized in groups, a group being able to contain other groups nested therein and define constraints on the order of appearance of the elements that it contains.

In addition, for each element, its number of occurrences within its own group can be defined. A group may, for example, be a sequence, in which all the elements appear in the order indicated in the XML Schema, a choice in which only one of the listed elements appears, or a complete group ("all") in which all the elements appear once and once only, in any order.

Depending on whether they are created dynamically or from an XML Schema, the local dictionaries are different. They may not include the same entries (productions in the case of a grammar), or contain them in different orders, and in the case of structure dictionaries the number of dictionaries (grammars) corresponding to a given XML element may be different.

The prior constitution of the local structure dictionaries at the encoder or decoder makes it possible to accelerate the subsequent processing operations of encoding or decoding documents substantially in accordance with the description supplied in the XML Schema, since some entries have already been created.

FIG. 1 shows an extract of an XML Schema 1. The latter describes an element "person" representing a person. According to the XML Schema, this element comprises several sub-elements 2 as follows: first of all an obligatory sub-element "name", and then one or more "address" sub-elements and finally zero or several "phone" sub-elements. In summary, any "person" element in accordance with the Schema comprises a "name" element necessarily followed by at least one "address" element. This "address" element can be followed by other "address" elements. These "address" elements can be followed either by one or more "phone" elements or by no other element.

FIG. 2 shows the four dictionaries of structures (grammars) $10_0$ to $10_3$, in accordance with the EXI specification, which are obtained from the XML Schema in FIG. 1.

For each dictionary $10_0$ to $10_3$ ("person_0", "person_1" . . . ), the list of entries (productions) is specified as follows: the type of event corresponding to the entry (SE for "Start Element", that is to say the start of a sub-element, the name of which is specified between parentheses, EE for "End Element", that is to say for the end of the "person" element), the following dictionary to be used when the entry is used for coding (or decoding) and the index (coding value) for coding the use of the entry in the coded document.

Thus the first dictionary, "person_0", contains a single entry, which corresponds to the start of a "name" element, the following dictionary to be used being the dictionary "person_1" and the index for coding the start of the "name" element being "0".

In accordance with certain options of the EXI specification, the coding of this index, during an occurrence of the "name" element in an XML document to be coded, is carried out on a minimum number of bits. Thus in this case, as there is only one index in the dictionary of structures, this index is coded in 0 bits (since it is completely predictable). On the other hand, in the case of the third dictionary, "person_2", as there are three indices, these indices are coded in 2 bits.

One drawback of this encoder or decoder initialization mechanism lies in the need for a large amount of memory space for storing all the structure dictionaries.

This is because, as can be seen in FIG. 2, the information (grammars) resulting from the conversion of the description data (XML Schema) at the decoder or encoder have entries appearing in several dictionaries, sometimes with different indices, which is in particular the case for the entry "SE (address)", which appears in the dictionaries "person_1" and "person_2", or for the entry "SE (phone)".

A direct representation of the dictionaries of structures from the XML Schema requires, because of this, duplicating this information.

The publications US 2007/239,393 and "Type-based compression of XML Data" (Christopher League et al., March 2007) are also known, which describe the structure information of an XML Schema, not directly in the form of grammars but by means of a finite state machine.

In this finite state machine, the nodes contained in the element described by the XML Schema are described by transitions, while the states of the machine correspond to the positions between these nodes. Thus each node contained in an element is described by at least one transition, the number of transitions describing this node depending on the number of cases in which this node may appear. In addition, for each state, the number of transitions starting from this state corresponds to the number of nodes able to occur in this state.

With respect to the preceding description of the EXI specification, each state with the related transitions associated with it represents a structured dictionary. This solution therefore achieves a direct implementation of the EXI specification seen above.

During coding (or decoding), the finite state machine is used for coding the structure information: from a given state, the following node type is coded according to the number of efferent transitions of this state.

Because of the state/transition—structure dictionary correspondence, the representation of the content of an element by a finite state machine, that is to say the information converted at the coder/decoder using the XML Schema, corresponds to the representation of the structure dictionaries of the EXI format. Representation by means of a finite state machine therefore also has the drawback of requiring a large amount of memory space.

In general terms, the initial configuration of encoder or decoder according to the known solutions of the prior art generates a large number of structure dictionaries or equivalent, in which a great deal of information is common and numerous structures are redundant. The result is ineffective use of the memory.

The patent application US 2003/018,466 is also known, which describes an XML data encoding and decoding method starting from a DTD schema. However, in this method, several generators that require memory and processing resources are used to switch between the DTD schema data and an ASN abstract syntax type.

The invention aims to mitigate this problem by optimizing the memory space used during the configuration of the encoder or decoder.

BRIEF SUMMARY OF INVENTION

For this purpose, the invention relates in particular to a method of coding or decoding a structured document of items, comprising a step of configuring an encoder or decoder including the obtaining of data describing a document structure model, and the storage of said data in the form of recordings intended to be used by the encoder or decoder for coding or decoding items of a structured document, wherein a recording associated with an item comprises the minimum and maximum numbers of occurrences of said item defined by the structure model, and the method comprises the following steps:

calculating a number of items, referred to as "possible items", able to succeed, according to the structure model, an item of said model, storage of said number of possible items in a recording associated with said item. In particular, the number of possible items is calculated for all the items defined in the XML Schema.

The description data may be an XML Schema file, a fragment of such a file or any adapted representation of such a file/fragment, for example a set of computer structures.

By directly storing the information on the number of possible items at the data used by the encoder or decoder, the latter can effectively and at less cost determine certain coding or decoding information, such as for example the coding format (the number of bits used). In sharp contrast, prior art publications do not explicitly store such information to further simplify their processing.

Other information for the coding or decoding are also determined, for example the value to be coded, which is deduced from the position of the recoding associated with an item to be coded/decoded among the recordings of the possible items.

Thus, unlike the solutions of the prior art, it is not necessary to duplicate the items described in the XML Schema in as many grammars as there exist contexts. Just the information on the number of possible items makes it possible to effectively delay the calculation of the coding index. Consequently the memory space necessary for the storage of a representation of the XML Schema at the decoder/encoder is reduced.

In addition, the use of the minimum and maximum numbers of occurrences allows easy calculation of the indications necessary for the coding or decoding, for a large number of items.

The invention applies particularly to the storage of structure information, corresponding to the grammars according to the EXI specification.

In particular, the number of possible items for the item is calculated using the minimum numbers of occurrences of the recordings of a plurality of other items. This calculation has the advantage of being rapid and can be used for relatively simple XML Schemas, for example for the description of an XML element not having a nested group of other items.

Moreover, said recordings are stored in the order of appearance of the items associated within description data. This arrangement makes it possible to perform simple operations in order, in particular to calculate the number of possible items or the position of the recording corresponding to the item to be coded in order to determine the corresponding coding value.

In one embodiment, the number of possible items of the recording gives information on the number (referred to as the theoretical number) of possible items, according to the structure model, in the case where the minimum number of occurrences of the item of the recording has been reached and the maximum number of occurrences of the item of the recording has not been reached. There are thus available homogeneous values for all the recordings. Identical processing operations are then applied for each of them.

Using these recorded values, it is possible to easily determine the actual number of possible items for the other cases (minimum number not reached, or maximum number reached). "Actual" means the case corresponding to the current state during a coding or decoding operation. By performing these calculations during the configuration of the coding or decoding device, the calculations during actual codings or decodings are minimized.

Thus provision is made for the method to comprise a second step of calculating a number, referred to as actual, of possible items for a current item preceding an item to be coded or decoded, the actual number being calculated from said theoretical number of possible items of the recording associated with the current item and the current number of successive occurrences of the current item in the document to be coded or decoded.

In a variant, said calculation is carried out at each coding or decoding of said item.

In particular, during the second step of calculating the actual number of possible items, the method comprises a step of adjusting said actual number of possible items based on the presence of text values or items not described by the structure model of the document. The adjustment can for example consist of a simple incrementation by "1" if text data is present. This embodiment also makes it possible to take account of deviations defined by the EXI specification.

According to one characteristic of the invention, the method comprises a step of calculating an item of coding or decoding information for coding or decoding an item, for example a binary index, based on said number of possible items associated with the current item preceding the item to be coded or decoded. As mentioned previously, the number of possible items stored in accordance with the invention makes it possible to calculate the coding or decoding information directly.

In particular, the number of bits of the coding information is determined based on said actual number of possible items.

In one embodiment, said data obtained are stored in the form of a single recording for each item of the structure model. In this way improved use of the memory of the encoder or decoder is guaranteed.

According to one feature of the invention, the method comprises the determination of the possible item able to succeed a given item, which is furthest away from said given item in the order of appearance within the description data, and for an item following said given item, said number of possible items is calculated based on the number of items separating the following item and said furthest-away item.

Here use is made of the property of the furthest-away item according to which at a minimum this item can succeed the given item, in order to deduce therefrom that the intermediate items are optional. Thus, for the latter also, the item furthest away constitutes a "compulsory" item, which therefore delimits the number of possible items. All that remains to do then is to count these optional items situated before the furthest-away item. According to this provision of the invention, calculations of the number of possible items are greatly simplified.

In particular, said given item is the item listed first within an element of the structure model. This is because increased efficacy is obtained if these simplified calculations are carried out as from the first item defining an element, since the numbers of possible items are calculated simply for all the optional following items.

Also, the determination of the furthest-away possible item is iterated for a plurality of items following the given item, and said determination for an item consists of keeping the item furthest away from the previous iteration when it is different from the item referred to by the current iteration. The number of processing operations necessary for determining the number of "possibilities" (items able to succeed a given item) is thus reduced. These consecutive items, as long as they are different from the furthest away item, correspond to optional items.

In combination generally, said determination of the furthest-away possible item comprises the identification of the first item, subsequent to said given item in the order of the description data, associated with a recording, the minimum number of occurrences of which is non-zero. The determination is thus rapidly carried out by simple identification on the minimum numbers of occurrences.

In particular, the determination of the furthest-away possible item for a plurality of items following the given item is iterated, and said determination consists of identifying said first item having a non-zero minimum number of occurrences, when the item to which the current iteration relates is the furthest-away possible item of the previous iteration. This provision is in particular combined with the simple keeping of the furthest-away item during the iteration for optional items, so as to limit the processing operations according to the invention to what is strictly necessary.

In one embodiment of the invention, said description data describe at least one group of items within which at least one other group of items is nested, a group of items describing the structure of the items constituting an element, and at least one of said recordings is associated with each group of items and gives information on the minimum and maximum number of occurrences of the group as defined by the structure model.

This concept of group has already been defined above and reflects the fact that an element can contain other elements, themselves defined by a set of items.

In this case, provision is made for at least one recording associated with a group to give information on the number of possible items able to follow, in said group and according to the structure model, an item preceding the group or an item in said group when this group is iterated.

This number can be defined principally in two ways:
the number of possible items able to succeed or follow, in said group and according to the structure model, an item preceding the group or an item in said group during an iteration of this group; or
the number of possible items able to occur as the first item in said group according to the structure model.

In a similar fashion, at least one recording associated with a group gives information on the number of possible items able to succeed, according to the structure model, an item in said group.

This number can be defined principally in two ways, as being the number of possible items able to succeed, outside the group and according to the structure model:
an item in said group, or
after said group.

Again, at least one recording associated with a group gives information whether all the items in the group are optional or not.

Also, a recording of each item in a first group and the at least one recording associated with a group nested in said first group comprise an indication of end of group indicating whether an item external to said first group is a possible item for succeeding said item or said nested group, according to circumstances. In other words, provision is made here for indicating whether the end of the first group can occur after said item or said nested group, according to circumstances, which facilitates the operations of calculating the actual number of possibilities subsequently.

Moreover, a recording of each item comprises said number of possible items, able to succeed, according to the structure model, this item within the group comprising the item, said calculation of said number of possible items within the group comprising:
running through said description data in the order of appearance of the items corresponding to said group comprising said item associated with the recording, and as long as an item, a group, or all the items in a group are optional when running through, incrementing a counter of said number of possible items by "1" or increasing said counter by a number of possible items within said group, according to circumstances.

The optionality of an item can in particular be read directly on the minimum number of occurrences.

Taken individually or combined, these supplementary items of information at the recordings enable the decoder or coder in particular to determine more quickly the actual number of possible items for a current item with a view to coding or decoding a following item, whatever the complexity of the XML Schema processed.

Thus, according to one particular characteristic of the invention, the method also comprises a step of calculating an actual number of possible items for a current item preceding an item to be coded or decoded, which depends on:

the minimum and maximum numbers of occurrences, the number of possible items within the group and said indication of end of group, associated with the current item, and the minimum and maximum numbers of occurrences, said numbers of possible items able to succeed an item within the group or after the group, and said indication of end of group, for the groups nesting the current item.

The following detailed description, in particular with reference to FIG. 12, presents various steps of processing based on this information in order to determine, effectively and independently of the complexity of the XML Schema process, the number of possible items for a given current item.

Correspondingly, the invention also relates to a device for coding or decoding a structured document of items, comprising configuration means able to obtain data describing a structure model of documents and to store said data in the form of recordings intended to be used by the device in order to code or decode items of a structured document, the device comprising:

means of calculating a number of items, referred to as "possible items", able to succeed, according to the structure model, an item of said model;

said number of possible items being stored in a recording associated with said item.

The device has advantages similar to those of the method disclosed above, in particular reduced use of its memory resources.

Optionally, the device can comprise means relating to the features of the configuration method disclosed above.

Likewise, the invention relates to a data structure representing a document structure description file, comprising a plurality of entries corresponding to a plurality of items defined in said file, in which an entry associated with an item comprises:

the minimum and maximum numbers of occurrences of said item defined by the structure model, a number of items, referred to as "possible items", able to succeed, according to the structure model, said item associated with the entry.

The information contained in this structure has, in the same way as the above method and device, the advantage of representing an XML Schema concisely, and therefore using a small amount of memory space.

In particular, said entries are ordered in the structure in a similar fashion to the corresponding items within said description file.

In order to facilitate the management of any type of XML Schema, provision is also made for the entry associated with an item to comprise an indication of end of group as disclosed previously. Entries associated with groups as defined above are also provided, these entries comprising the numbers of possible items for succeeding the corresponding start or end of element items in the group, an indication whether all the items in the group are optional or not, an end of group indication, and the number of possible items within the group.

An information storage means, possible totally or partially removable, able to be read by a computer system, comprises instructions for a computer program adapted to implement the coding or decoding method according to the invention when this program is loaded into and executed by the computer system.

A computer program able to be read by a microprocessor comprises portions of software code adapted to implement the coding or decoding method according to the invention, when it is loaded into and executed by the microprocessor.

The information storage and computer program means have features and advantages similar to the methods that they implement.

BRIEF DESCRIPTION OF DRAWINGS

Other particularities and advantages of the invention will also emerge in the following description, illustrated by the accompanying drawings, in which:

FIG. 1 depicts an example of a fragment of XML Schema for illustrating the present invention;

FIG. 2 depicts structure dictionaries constructed from the fragment in FIG. 1, according to the known techniques of the prior art;

FIGS. 3a and 3b illustrate a representation, in table form, of the fragment in FIG. 1 according to the present invention;

FIGS. 8a to 8c illustrate a representation, in the form of a table, of the fragment in FIG. 6 according to the present invention;

DETAILED DESCRIPTION OF INVENTION

Figure 4:
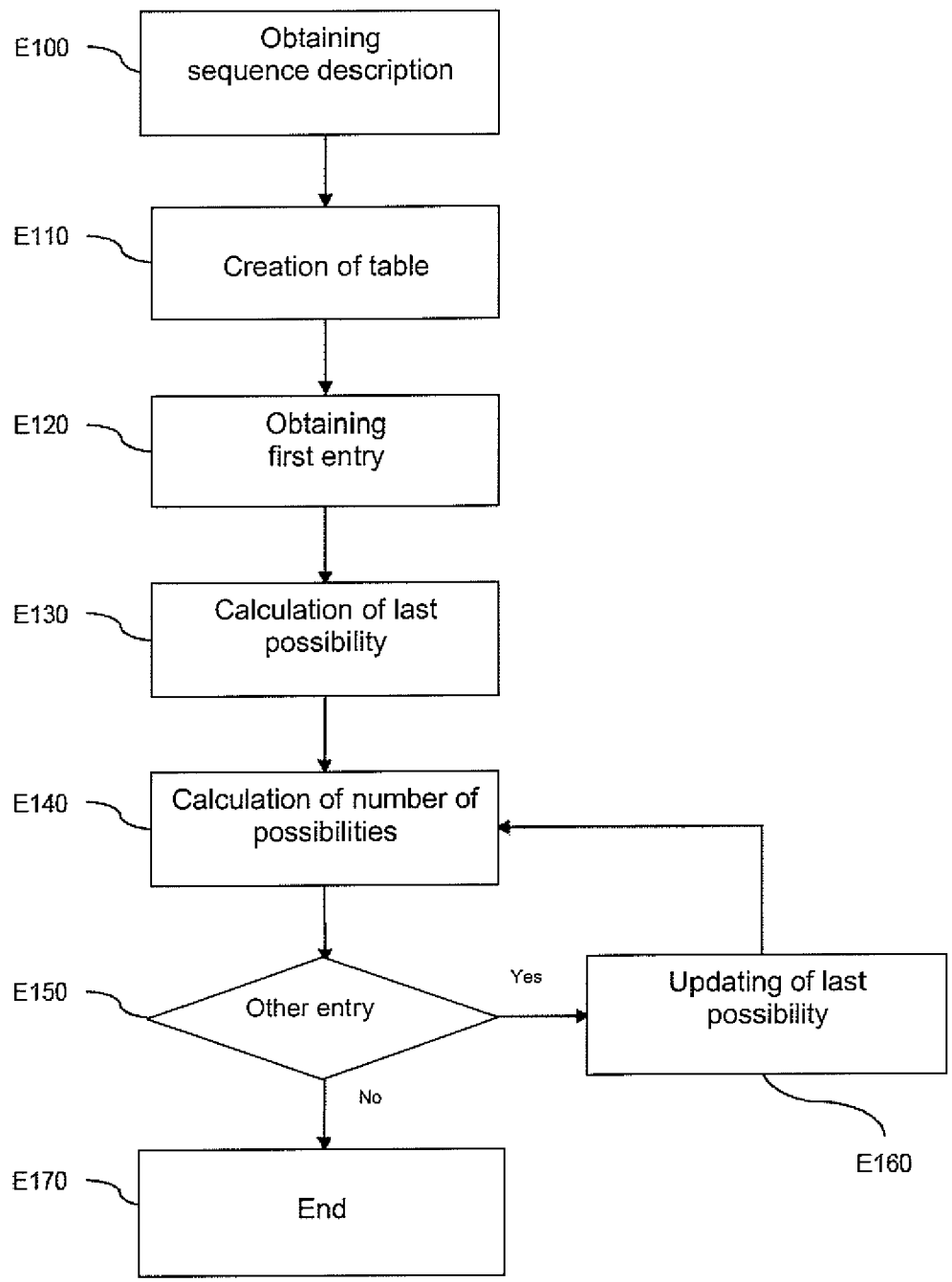
FIG. 4 shows, in the form of a logic diagram, steps of constituting the table in FIGS. 3a and 3b.
Figures 5, 6:
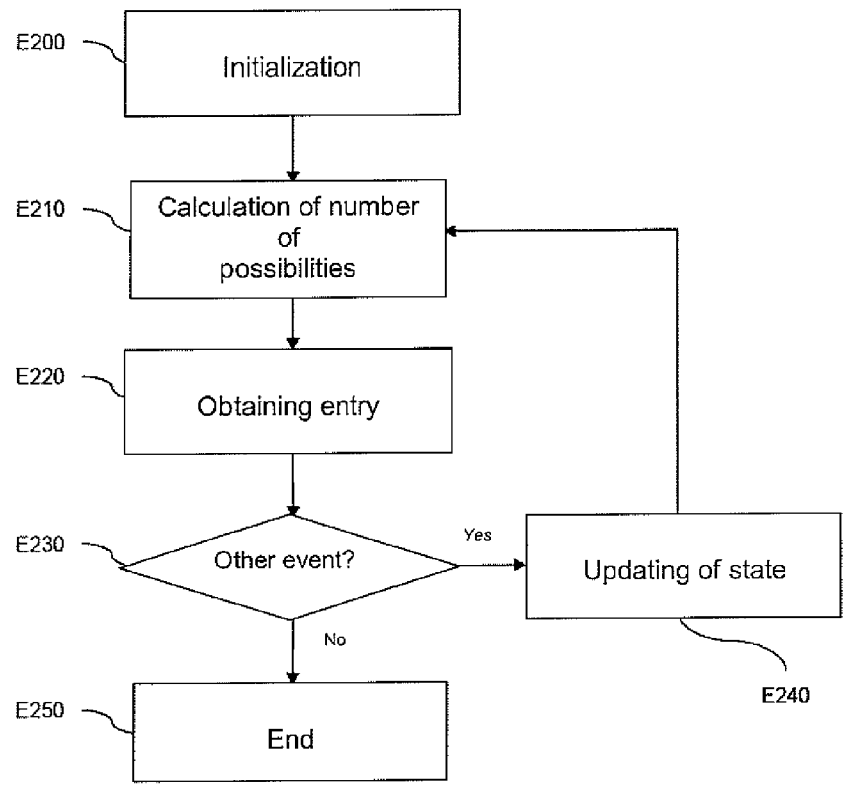
FIG. 5 shows, in the form of a logic diagram, steps for the calculation, according to the invention, of structure dictionaries from the table in FIGS. 3a and 3b.
FIG. 6 shows another example of a fragment of XML Schema.

In order to illustrate the present invention, a description is first of all given, with reference to FIGS. 3 to 5, of a simple implementation for the case of the XML Schema in FIG. 1. This describes a simple sequence of elements and corresponds to a frequent case of XML Schema or a fragment of such a schema.

The method according to the invention will next be illustrated, with reference to FIGS. 6 to 12, in a more general case.

As shown in FIG. 2, the structure dictionaries configuring an encoder or decoder according to the techniques of the prior art are numerous and comprise redundant information.

FIGS. 3a and 3b illustrate representations, in the form of tables, to be stored in the memory of the encoder or decoder, and making it possible to configure the latter from the XML Schema 1.

FIG. 3a shows a table 20 containing all the XML elements able to be present in the "person" sequence defined by the XML Schema 1 (column 30), with their minimum number (column 31) and maximum number (column 32) of occurrences also defined in the XML Schema file 1. The entries in this table 20 are ordered in a similar fashion to the appearances of the corresponding items in the XML Schema file.

In this table, the first entry 21' indicates that the first element able to be contained in the "person" element is a "name" element, which must appear once and once only. The second entry 22' indicates that this "name" element is followed by an "address" element, which may be repeated an indefinite number of times. The third entry 23' indicates that the "address" element may be followed by an optional "phone" element and which may be repeated an indefinite number of times. The fourth entry 24' represented by the code "EE" indicates the end of the "person" element following on from the "phone" element or the "address" element when no "phone" element is used.

This table 20 is sufficient for the creation of the EXI structure dictionaries since it contains all the information necessary for this operation, as illustrated below.

Compared with the tables in FIG. 2, where each dictionary lists all the elements able to succeed the element from which this dictionary is accessed, all the elements are referenced, in a single example, within the table 20. The latter thus makes it possible to reduce the memory used for the representation of the structure dictionaries.

For the remainder of the description, the term "possibility" is given to one of the items in the broad sense able to succeed another item according to the structure defined in the XML Schema. In the example in FIG. 2, the "number of possibilities" for an element corresponds to the number of entries in the dictionary (grammar) following this element. It can therefore be seen that the number of possibilities depends on the current grammar and therefore on the current context.

In practice the table 20 is used for obtaining all the information necessary for coding (or decoding) an event/particular item of the content of the "person" element.

In a particular embodiment, the table 20 is used to create only the temporary structure dictionary necessary for coding (or decoding) an event/particular item of the content of the "person" element. After the coding (decoding) of this event, the structure dictionary temporarily created is destroyed and a following dictionary is created for the coding (or decoding) of a subsequent event.

Thus the use of this table 20 makes it possible to reduce further the memory used, during coding (or decoding), for representing the structure dictionaries.

Because in particular of the dependency of the encoding of the values to be coded with the number of possibilities for the element previously coded, a step of calculating the number of possibilities for this previously coded element is provided.

This calculation can be carried out as the encoding proceeds or prior to encoding.

In the first case, the calculation is repeated for each coding of an event. For example, if an XML document contains several occurrences of the "person" element, the same number of calculations of the number of possibilities is made for the items constituting this element.

In the second case, when the table 20 is created, there is stored, for each element of the XML Schema, the number of possibilities corresponding to each item in the table when the minimum number of occurrences for this item has been reached but the maximum number of occurrences for this item has not been reached. This number of possibilities is stored in a new column 33 in the table 20 as illustrated in FIG. 3b.

However, in a third case, the number of possibilities is calculated during encoding but is also stored, which avoids having to calculate it again.

In our simplified example, this calculation is carried out by running through part of the table 20 in FIG. 3a from the item for which this number of possibilities is calculated.

For example, after the coding of an "address" element, "1" being the minimum number of occurrences for this element, there exist three possibilities: the start of another "address" element, the start of a "phone" element or the end of the "person" element (EE). These three possibilities correspond to the dictionary of structures "person_2" of FIG. 2.

Thus, as shown in FIG. 3b, if at least one event "SE (address)" has already been coded, then there are three possibilities for the following event, which are those described by the current entry 22' and the following two 23' and 24'.

Three cases may occur for a given item.

Firstly, the minimum number of occurrences for this item has not yet been reached. In this case, the only possibility is the item itself. In such a case, calculation of the number of possibilities is immediate. Thus, if no event "SE (address)" has yet been coded, then the only possibility is this event "SE (address)" in accordance with the prerequisite of a minimum occurrence of this event (see column 31 of this element).

A second case is the one where the minimum number of occurrences for this item has been reached but the maximum number of occurrences for this item has not yet been reached. In this case, the number of possibilities for this item is calculated according to the minimum number of occurrences and the maximum number of occurrences for the following items. This calculation is described subsequently with reference to FIG. 4.

The last case is encountered when the maximum number of occurrences for this item has been reached. In this case, the number of possibilities is the one stored for this item, minus 1, since the item itself no longer forms part of the possibilities.

In a preferred embodiment for the invention, as indicated previously, it is the number of possibilities corresponding to the second case that is stored in column 33 of the table 20, since this generally corresponds to the most usual cases.

In a variant, it is the number of possibilities corresponding to the third case that is stored in column 33 of the table 20.

In another variant, all these numbers are stored in column 33 of the table 20.

It should be noted that, where the minimum number of occurrences and the maximum number of occurrences for an item are equal, the number stored in column 33 of the table 20, as illustrated subsequently, is not used by the coding or decoding algorithm described below with reference to FIG. 5. For reasons of optimization, it is possible to store nothing in this column 33 for this element.

Referring to FIG. 4, a description is given of various steps of the simplified method according to the invention for obtaining the table 20 in FIGS. 3a and 3b, by conversion from XML Schema 1.

At step E100, the description of the sequence of elements constituting the element for which the table 20 must be created is first of all obtained. This description is obtained in the form of a fragment of XML Schema 1, or in the form of a structure, for example a computing structure, describing this XML Schema fragment.

At step E110, the table 20 is created from the description of the sequence of elements.

To do this, for each element 2 of the sequence 1, a line 21' to 23' is added containing an event 30 of the start of this element, the minimum number 31 and the maximum number 32 of occurrences for this element. This information is read directly from the XML Schema 1.

In addition, a last line 24' is added to the table corresponding to the end (denoted EE) of the element described, in our example the end of the "person" element.

The following steps (E120 to E160) correspond to the calculation of the number of possible events for each line 21' to 23' in the table, as mentioned previously.

At step E120, the first entry 21' of the table is obtained, which is at this time the current entry.

At step E130, the last possibility with respect to this first current entry 21' is determined. This last possibility corresponds to the last entry in the table 20 corresponding to an event that may occur after the minimum number of occurrences of this first current entry 21' has been reached but its maximum number of occurrences has not yet been reached. Where these two numbers are equal, the latter possibility is calculated by assuming that they are different. This assumption makes it possible to obtain a similar calculation whatever the respective values of the minimum number of occurrences of this first current entry and its maximum number of occurrences.

The use of this concept of last possibility makes it possible to optimize the calculation of the number of possibilities for the various entries in the table. This is because it is possible to update the last possibility easily for a given entry from the last possibility for the previous entry. This avoids performing this step E130 for all the entries in the table. This step E130 is performed only for the first entry while for the following entries the step E160 described below, less expensive in terms of calculation time, is performed to update the last possibility. From this last possibility, the calculation of the number of possibilities is simple to perform as illustrated below in relation to step E140.

In order to determine the last possibility corresponding to the first entry, the entries in the table 20 are first of all run through, during this step E130, starting from this first current entry 21', in order to find all the events that can be reached as soon as the minimum number of occurrences for this first current entry 21' has been reached.

In practical terms, if the number of possible occurrences for the element corresponding to this first entry is fixed, that is to say if its minimum number of occurrences is non-zero and its maximum number of occurrences is equal to this minimum number of occurrences, then the last possibility is this first entry 21'.

In the contrary case, the following entries 22'-24' are run through in order. As long as the entry run through has a minimum number of occurrences equal to zero, the algorithm passes to the following entry. Thus the algorithm finds the first entry, apart from the first current entry 21' in the table 20, having a strictly positive minimum number of occurrences. If there are not any, the algorithm selects the last entry in the table, corresponding to the end of the element described.

During step E140, the number of possibilities is then calculated from the current entry, the first entry 21' during the first iteration, counting the number of entries between the current entry and the one corresponding to the last possibility (including these two entries, for calculating the general case where the minimum number of occurrences of the element has been reached and the maximum number not yet reached). This number calculated is stored in the last column 33 in the table 20, for the current entry.

At step E150, the algorithm checks whether there remain other entries 22'-23' not processed. If such is the case, it selects the following entry, which becomes the current entry. Then the algorithm continues at step E160.

If such is not the case at step E150, the algorithm ends at step E170.

At step E160, the algorithm first of all updates the last possibility with respect to the current entry. This determination can be made during step E130.

However, according to a particular implementation, this determination is optimized by using the last possibility corresponding to the previous entry.

In particular, if the last possibility during the previous iteration is not the new current entry, this last possibility remains unchanged. Unnecessary calculations corresponding to those of step E130 are thus avoided.

On the other hand, if the last possibility is equal to the current entry or the entry preceding the current entry, the algorithm determines the last possibility as described in relation to step E130.

By iterating these operations, table 20 in FIG. 3b is obtained.

This algorithm can be adapted to calculate the number of possibilities corresponding to an entry only when this is necessary. In this adaptation, steps E100 and E110 are performed prior to the encoding or decoding and make it possible to generate the table 20 in FIG. 3a. Next, when an entry is selected during encoding or decoding, steps E130 and E140 are performed with respect to this entry in order to calculate the number of possibilities for this entry.

A description is now given, in relation to FIG. 5, of the use of such a table 20 during the encoding or decoding of the content of a "person" element of an XML document. More precisely, the steps presented below describe how the information contained in a structure dictionary and used for the encoding/decoding of XML items are reconstructed from this table 20.

In the absence of any contrary indication, the steps described below apply both to encoding and decoding.

In the example of coding, three items of information are generally used for coding an event from the structure dictionary according to the EXI specification.

The first item of information is the position of the entry corresponding to this event in the structure dictionary. This position makes it possible to determine the value to be coded for representing this event in the case of coding. In the case of decoding, this position is obtained from the coded value and makes it possible to determine the coded event.

The second item of information is the number of entries present in this structure dictionary. This number of entries makes it possible to determine the way in which the value used for representing this event is coded. More precisely, this value is coded in the minimum number of bits making it possible to represent all the values associated with the entries of the structure dictionary, which corresponds to the minimum number of bits making it possible to code the number of entries of the structure dictionary minus 1. Thus, for example, if there are 3 entries in the structure dictionary, it is necessary to be able to code the values 0, 1 and 2, and therefore 2 bits are necessary. With 4 entries, 2 bits are also necessary, but with 5 entries 3 are necessary. It should be noted that, in certain cases, the coding is more complex but remains an extension of this mechanism. The present invention therefore also applies thereto.

The third item of information is the structure dictionary to be used for the following event. In the context of the invention, the encoding and decoding of XML items do not use a structure dictionary. This third item of information is therefore not necessary. This is because, during the coding (or decoding) of all the events corresponding to the content of a "person" element, the same table 20 is used. The information corresponding to the various structure dictionaries making it possible to code these events is reconstructed directly from this table 20.

Thus, in detail, a first initialization step E200 is provided during which the current entry in the table is defined as the first entry 21' in the table 20 (that is to say it is sought here to code/decode the first sub-element of an occurrence of the "person" element). A counter for the number of occurrences of the last event is also initialized to 0.

At step E210, the actual number of possibilities for the following event is calculated. This actual number of possibilities corresponds to the second item of information necessary for the coding or decoding of an event and takes account of the current state.

To perform this calculation, the counter for the number of occurrences of the last event is compared with the minimum number of occurrences of the current entry.

If this number of occurrences of the last event is strictly less than the minimum number of occurrences of the current entry, then only the event corresponding to the current entry is acceptable: there is therefore only one actual possibility for the following event.

Otherwise the actual number of possibilities is the one stored in the last column 33 of the table 20.

It should be noted that, in the algorithm in FIG. 5, the case where the maximum number of occurrences of the current entry is reached cannot occur at step E210: step E240 prevents this as described below.

Thus, in our example, when the current entry in the table is the second entry ("SE (address)"), and no occurrence of an event "SE (address)" has yet occurred, the only possibility accepted for the following event is an event "SE (address)".

Still for the same current entry, if at least one occurrence of this event has already been coded or decoded, then there are three possibilities for the following event, as indicated in the last column 33 of the table. These three possibilities correspond to the current entry 22' and the following two 23'-24'.

It should be noted that, if the event to be coded or decoded does not correspond to one of the possible events, there is an error that must be dealt with as defined by the EXI specification.

During the following step E220, the coding or decoding of the event is carried out.

In the case of coding, the event to be coded is sought in the list of possibilities accepted for the following event, that is to say in the current entry and/or the number of following entries corresponding to the number of possibilities calculated at the previous step E210. The position of the entry corresponding to the event to be coded with respect to the current entry makes it possible to determine the first item of information necessary for its coding.

Thus, by repeating the previous example, with the second entry 22' as the current entry in the table 20 and assuming that at least one event "SE (address)" has already been coded, if the event to be coded is "SE (phone)" (start of "phone" element), then the corresponding entry is the first 23' after the current entry 22'. The value to be coded is therefore "1" (the value "0" being used for coding a new occurrence of the "address" element). And this value is to be coded in two bits, necessary for coding the three possibilities.

After having determined the value used for coding the event, this event is actually coded, by coding this value and possibly other parameters of this event. The whole of the coding is carried out according to the EXI specification.

In the case of decoding, the "second item of information" determined makes it possible to recover, in a coded EXI stream, the correct number of bits for decoding the value representing the following event. This value is therefore decoded and used for obtaining the corresponding entry in the table. According to the event corresponding to this entry in the table, other parameters describing this event can be decoded. The whole of the decoding is carried out according to the EXI specification.

Thus, taking the previous example again, with the second entry 22' as the current entry in the table 20 and assuming that at least one event "SE (address)" has already been decoded, if the decoded value is "2", then the event corresponds to the second entry after the current entry, that is to say to the event "EE", which corresponds to the end of the "person" element.

Both for coding and for decoding, the algorithm continues at step E230, checking whether other events describing the content of the current "person" element must be coded or decoded. This check consists of checking whether the last event coded or decoded is an end of "person" element "EE" or not.

If the response to test E230 is negative, that is say if all the events describing the content of the current "person" element have been processed, then the coding or decoding of this current element ends at step E250.

If such is not the case, the algorithm continues at step E240. During this step, the parameters used by the algorithm for the following event are updated. For this purpose, the current entry becomes the one corresponding to the last coded or decoded event, that is to say the last entry used. In addition, the number of occurrences of the last event is updated. That is to say the counter for the number of occurrences is incremented by "1" if the current entry has not changed and takes the value "1" if the current entry has changed.

In addition, if the maximum number of occurrences for this new current entry is reached, then the new current entry is the following entry and the number of occurrences of the last event is reset to zero. This mechanism makes it possible to simply manage the case where the maximum number of occurrences is reached, avoiding in particular additional tests during step E210.

Then the algorithm continues at step E210 for processing the following event.

A general case of the present invention is now described with the help of FIGS. 6 to 12.

FIG. 6 presents an XML Schema 1, the structure of which described is more complex than for FIG. 1.

This XML Schema 1 describes in particular an element "document" comprising one or more sequences of contents, each sequence representing part of an XML document associated with this structure schema.

A content sequence commences with an obligatory element "title". This element is followed by a choice 40 between an element "subtitle" and an element "abstract", these two elements being optional. Then the sequence is completed by an indeterminate number of elements "paragraph" followed by a possible (optional) element "note".

Figures 7, 9:
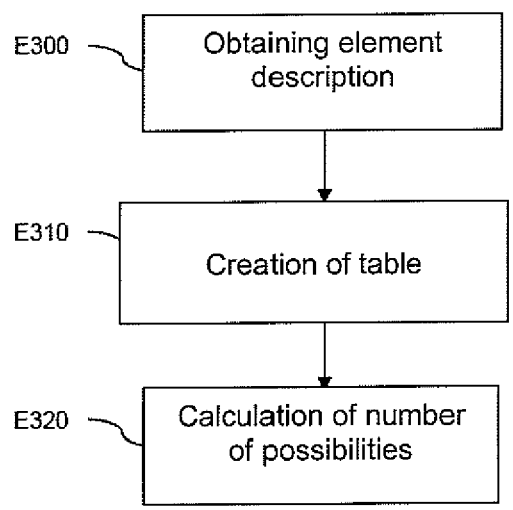
FIG. 7 shows structure dictionaries constructed from the fragment in FIG. 6, according to the known techniques of the prior art.
FIG. 9 shows, in the form of a logic diagram, generic steps for constructing a table depicting an XML Schema.

By following the conventional rules for creating structure dictionaries of the EXI specification, five dictionaries $10_0$ to $10_4$ are constructed as illustrated by FIG. 7, where there also numerous redundancies between the various entries in the dictionaries are observed.

FIG. 8*a* shows a table 20 obtained through implementation of the present invention. In a similar fashion to the table in FIGS. 3*a* and 3*b*, the number of entries is here limited to one per type of element, reducing the size of the data to be stored by the encoder or decoder concerned.

It will be observed that this table 20 also contains entries corresponding to the starts and ends of groups, here the group formed by the general sequence and a sub-group 40 formed by the choice between the elements "subtitle" and "abstract".

The general algorithm for constructing such a table 20 representing the structure of an element is described by FIG. 9. This algorithm is a generalization of the algorithm in FIG. 4.

The table in FIG. 8a will be supplemented, as illustrated below in relation to FIG. 10, by values for calculating the actual number of possibilities for a following event during the coding or decoding.

The construction of the table 20 in FIG. 8a comprises, during a first step E300, the obtaining of the description of the element, for example in the form of a fragment of XML Schema 1 or in a representation adapted to this fragment of XML Schema, for example a set of data-processing structures.

At step E310, the table 20 is created from this description 1 of the element "document". An entry 21-29 is provided here for each item, element or attribute, listed within the element "document" in the XML Schema 1, as well as the starts and ends of groups, ensuring that the order of appearance of these various elements is preserved. In addition an entry "EE" is provided for representing the end of the element "document".

For each entry corresponding to an element, the minimum 31 and maximum 32 numbers of occurrences are indicated as defined by the XML Schema 1.

It should be noted that, in the presence of attributes within the meaning of the EXI specification, the same numbers are indicated. However, as the choices for these numbers are small, their representation can be adapted by means for example of a binary indicator: an attribute is either obligatory and must appear only once or optional and must appear no more than once.

In addition, for each start of group, its minimum and maximum numbers of occurrences (of the group) are added.

Figure 10:
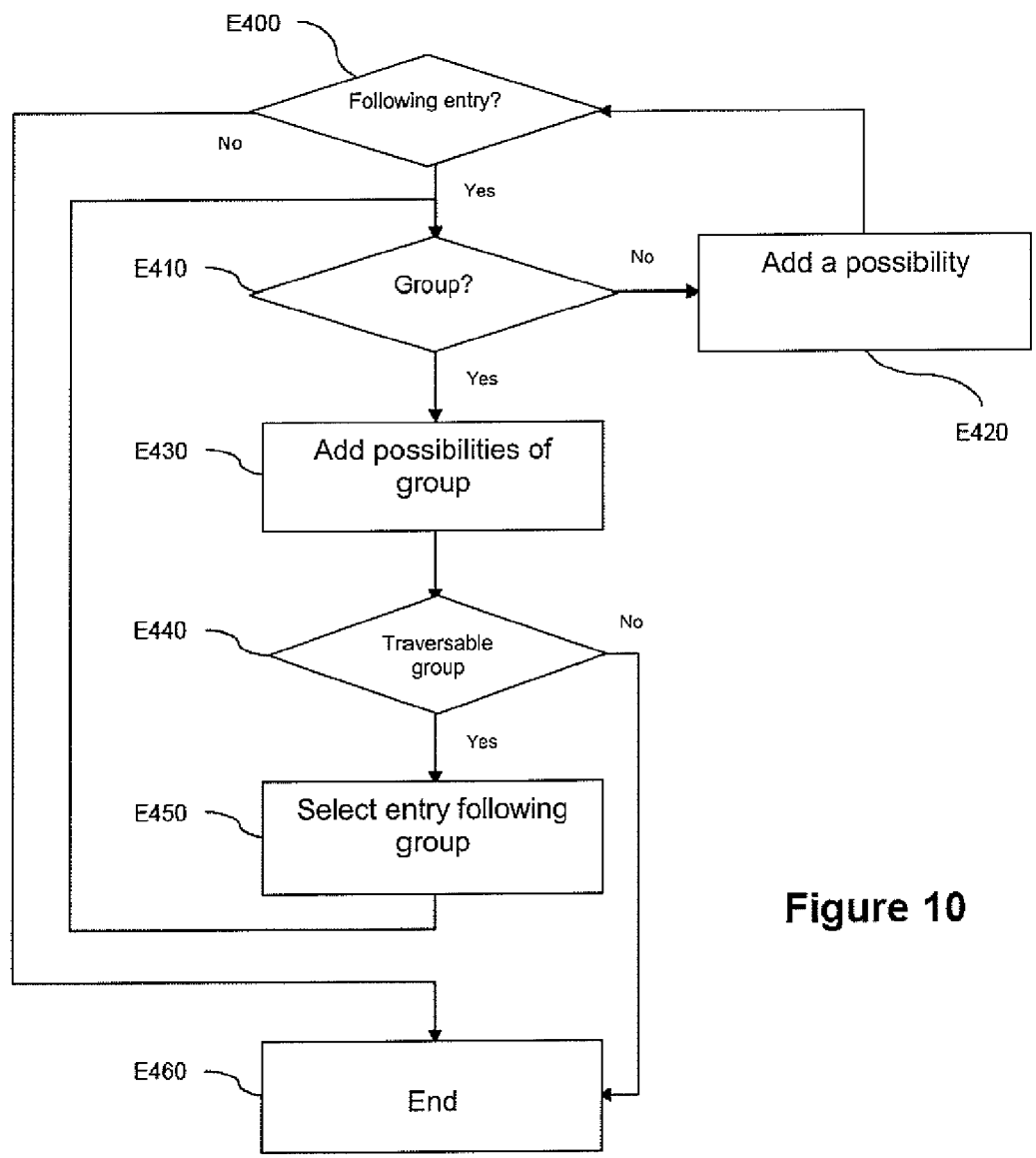
FIG. 10 shows, in the form of a logic diagram, steps for the generic calculation of the number of possibilities of successor items for a given item, during the implementation of the method in FIG. 9.

The method continues at step E320 during which a number of possibilities associated with each entry 21-29 in the table 20 is calculated, in accordance with the steps in FIG. 10. As mentioned previously in relation to FIGS. 3a and 3b, the number of possibilities is calculated here for each entry in the most usual case, the one where the minimum number of occurrences of the entry has already been reached (the contrary case being easy to calculate on the fly since it is equal to one) and, where applicable, the maximum number of occurrences that have not been reached (in the contrary case, a calculation on the fly can also be carried out by deducting 1 from the number calculated below).

It should be noted that, even in the case where the minimum number of occurrences of the entry is equal to the maximum number of occurrences of this entry, this calculation is performed by assuming that the minimum number of occurrences of the entry has been reached but its maximum number of occurrences has not yet been reached. This is because this "theoretical" result will serve as a basis of calculation for the case where the maximum number of occurrences of the entry has been reached. In this way, there are available, in the table 20, numbers of possibilities in the same theoretical situation, which makes it possible to carry out similar processing operations for all the entries.

FIG. 10 illustrates the calculation of this number of possibilities of following item for an entry corresponding to an element contained in a sequence. For the entries corresponding to elements contained in a group of the choice or complete type, the calculation of the number of possibilities is described below.

Hereinafter, the entry for which it is wished to calculate the associated number of following possibilities is called the "calculated entry".

First of all the current entry is initialized to the "calculated entry" and a counter for the number of possibilities for the current entry to the value "1", corresponding to the possibility represented by the current entry itself.

At the first step E400, it is checked whether the following entry in the table 20 in FIG. 8a can be achieved.

If the current entry is the calculated entry, this consists solely of checking whether other entries exist after the calculated entry.

Otherwise this consists of checking firstly whether the current entry has a minimum number of occurrence equal to zero and secondly whether other entries exist after the current entry.

If such is not the case, the algorithm ends at step E460.

In the case where the current entry is the last entry in the group containing the calculated entry, the algorithm also ends at step E460.

If such is the case, the algorithm selects the following entry, which becomes the current entry.

At step E410, the method checks whether this new current entry is the start of a group (an entry of the type "Start . . . " according to the terminology used in the table in FIG. 8a).

If such is not the case, the method continues at step E420, during which the counter for the number of possibilities associated with the calculated entry is incremented by "1" in order to take into account this current entry. Then the algorithm continues at step E400.

If such is the case (output YES at step E410), step E430 is continued with by the addition, to the number of possibilities associated with the calculated entry, of the number of possibilities contained in the group. The calculation of the number of possibilities contained in a group is described below and is given in column 36 in the table 20 as illustrated in FIG. 8c.

Step E440 is continued with, checking whether the entry following the group can be achieved. This is in particular the case if one of the following conditions is satisfied:
- the minimum number 31 of occurrences of the group is zero;
- all the constituents of the group are optional, that is to say the group is said to be "traversable". The calculation for checking whether a group is traversable is described below and a corresponding indication is inserted in a column 38 in the table 20 as illustrated in FIG. 8c, in order to perform step E440 rapidly.

If one of these two conditions is satisfied, the method continues at step E450, during which the first entry just after the entry corresponding to the end of the group in the table 20 becomes the current entry.

The method then returns to step E410 so as to count the other "possible" entries that are situated after the group that has just been traversed.

If none of these conditions is satisfied during step E440, the method terminates at step E460.

Moreover, if no entry exists after the current entry, the method ends at step E460.

At step E460, the number of possibilities associated with the entry calculated has been obtained at the counter used during these steps and is stored in the table, in particular in the column 33 of possibilities.

In addition, if the entry corresponding to the end of the group to which the calculated entry belongs, here the end of the sequence, has been achieved (that is to say if this entry has been the current entry during at least one iteration of the steps), the calculated entry is marked as being able to achieve the end of the group, in column 34. As specified below, this information makes it possible to calculate precisely the number of possibilities for a given entry (see step E510 below).

FIG. 8b illustrates the table 20 obtained at the end of step E460, giving information in particular on columns 33 and 34 mentioned above.

It should be noted that, for the groups 40 included in another group, here the general sequence, the field 34 indicating whether the end of the general group (the sequence) can be achieved from the end of this group has also been calculated and given.

With regard to the entries contained in a choice or in a complete group, no calculation of the number of possibilities associated with these entries is made on initialization of the coder or decoder since this calculation can easily be performed in its entirety during the coding or decoding. Thus, in the previous example, no calculation is to be made for the entries "SE (subtitle)" and "SE (abstract)". On the other hand, if this group had been a sequence, a calculation of the numbers of possibilities associated with each of the entries in this sequence would have been made.

With regard to the groups, for example the group 40, several values are calculated with reference to FIG. 8c.

As already mentioned above, a first value is the number of possibilities contained in the group, which corresponds to the number of possibilities that may occur within this group as from the start of this group. This value corresponds to the number of possibilities able to occur within this group after an entry preceding the group, or after an entry in this group during a new iteration of this group. This value is stored in the column 36 in FIG. 8c.

The calculation of this number of possibilities depends on the type of group concerned.

For a group of the sequence type, the number of possibilities contained in the group is calculated according to the first entry contained in this group. If the first entry contained in this group has a minimum number of occurrences equal to 0, then this number of possibilities is calculated by means of the method in FIG. 10, taking the first entry as the calculated entry. Otherwise this number of possibilities is equal to 1.

During this calculation, if the entry corresponding to the end of the group is achieved, the sequence is marked as traversable, by means of another value, of the Boolean type this time, at column 38 in the table 20 provided for this purpose.

Likewise, during this calculation, each entry considered at step E410 is marked with the current value of the number of possibilities for the sequence. This value corresponds to the index of the entry in its sequence and is stored at column 35. This value is used during the actual calculation of the number of possibilities associated with an entry in order to avoid counting the same entry several times (step E626 described below).

In the case of calculations made in accordance with the method in FIG. 10, it is observed that the final or intermediate results are stored at several places in the table 20. It is then ensured that the use of these calculations is optimized in order to perform each calculation only once.

For a group of the choice type (group 40 in FIG. 6), the number 36 of possibilities contained in the group is calculated by adding the number of elements contained directly in the group with the number of possibilities for each sub-group contained directly in the choice group in question. This number of possibilities for each sub-group contained directly in the choice group corresponds to the value stored in column 36 for this sub-group. It is observed that the calculation of the number 36 of possibilities contained in a group of the choice type depends on the result of this calculation for its sub-groups. Consequently the implementation of these calculations is ordered according to this dependency.

Moreover, the choice is marked as traversable (column 38) if at least one of its elements or one of its sub-groups has a minimum number of occurrences equal to zero.

For a group of the complete type, the number 36 of possibilities contained in the group is the number of elements contained in the group. It should be noted that a group of the complete type cannot contain other sub-groups.

Moreover, the complete group is marked as traversable (column 38) if all its elements have a minimum number of occurrences equal to zero.

Another value provided for the groups is the number of possibilities following the group, stored in column 37. This number of possibilities corresponds to the number of possibilities that can occur after the group within its parent group. This corresponds to the number of possibilities that may occur outside the group after the use of an entry of this group for coding or decoding, if the entries of the group following this entry are optional. This number of possibilities is calculated according to the type of parent group.

If the parent group does not exist, there is a single possibility after the group that corresponds to the end of element event.

If the parent group is a sequence, the number of possibilities depends on the minimum number of occurrences of the following entry. If there is no following entry in this parent group, then the number of possibilities is 0. If the minimum number of occurrences of the following entry is 0, then the number of possibilities is the one calculated by the method in FIG. 10 for this entry. Otherwise the number of possibilities corresponds to this following entry and is therefore 1.

If the parent group is a choice, the number of possibilities following the group within the parent group is equal to 0.

The parent group cannot be a complete group since a complete group can contain only elements.

This value is stored in column 37.

FIG. 8c illustrates the table 20 thus obtained.

In particular, for the group of the sequence type describing the whole of the element "document", one possibility has been determined in the group (column 36), and one after the group (column 37), and it has been determined that the group is not traversable (column 38).

For the choice group 40, two possibilities have been determined in the group (column 36), and one after the group (column 37), and it has been determined that the group is traversable (column 38).

Figure 11:
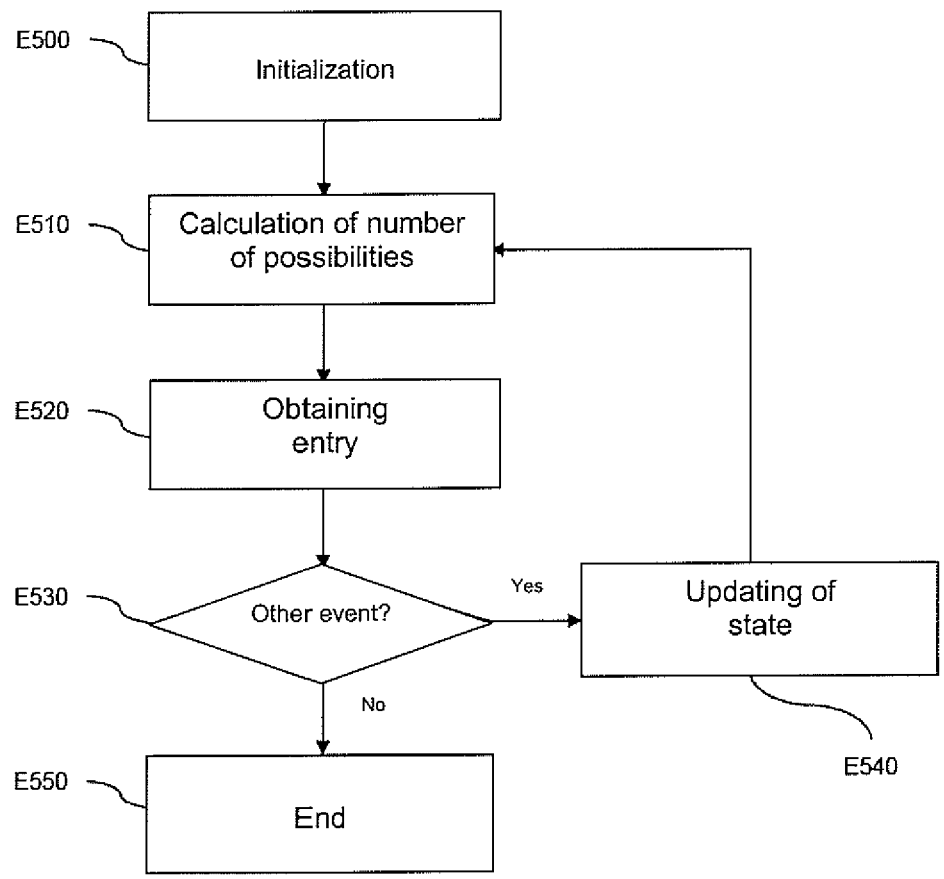
FIG. 11 shows, in the form of a logic diagram, steps for the calculation, according to the invention, of structure dictionaries from the table in FIGS. 8a to 8c.
Figure 12:
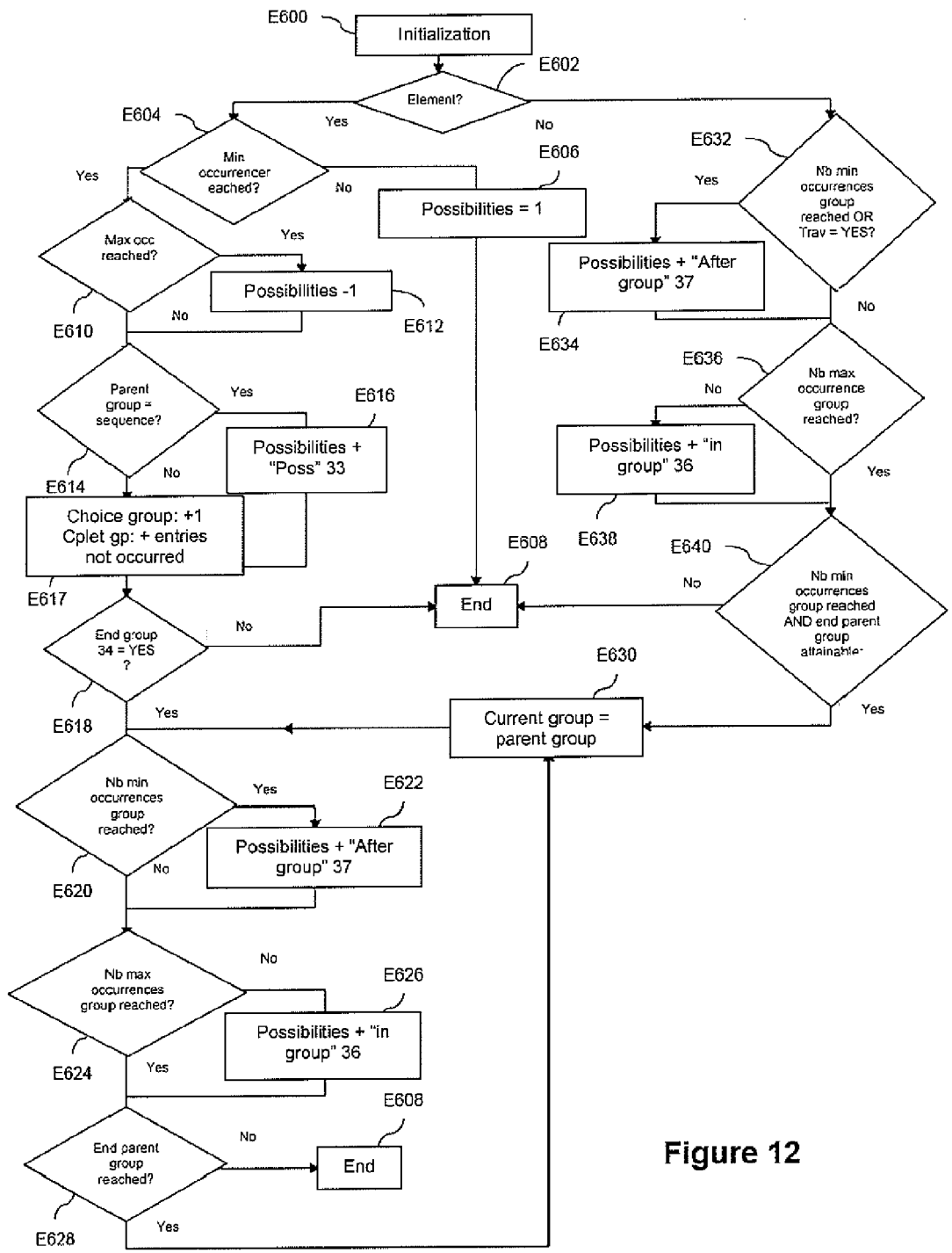
FIG. 12 shows, in the form of a logic diagram, steps for calculating the number of possibilities during the processing in FIG. 11.

Table 20 resulting from a method according to the invention is then used for performing an encoding or decoding of an XML element. FIGS. 11 and 12 illustrate an embodiment of the calculation of the structure dictionaries from this table 20.

The device implementing this processing has a current state containing, in a similar fashion to the case in FIG. 5, the current entry and the number of occurrences of the last coded event, and also containing the number of occurrences for all the groups directly or indirectly containing the last coded event. By observing that the groups are nested in one another (in our example, the choice group 40 is nested in the "document" sequence group), it is possible to define the parent/child terminology according to which the containing group is the parent of the nested child group.

Thus, in the case of the previous example, if the last coded event is "SE (abstract)", the state used contains the number of occurrences for the entry "SE (abstract)", for the choice group and for the principal sequence (the parent group of the choice group).

In general terms, the number of occurrences is stored for all the parent groups of the entry considered in the processing.

The first step, at step E500, is an initialization during which the current entry is defined as being the first entry in the table 20. A first counter for the number of occurrences of the last event and a second (or several) counter(s) for the number of occurrences for the group (or the "parent" groups), containing it are initialized to "0".

At step E510, the actual number of possibilities of following events for the current entry is calculated. This calculation takes account of the current state.

This step is illustrated by FIG. 12.

Beginning at step E600, a counter of the actual possibilities is initialized to 0.

At step E602, it is determined whether the current entry corresponds to an element (and not a start/end of group for example).

If the current entry corresponds to an element (output YES of step E602), the method checks, at step E604, whether the minimum number of occurrences for this element is achieved.

If this is not the case (output NO), the counter for the number of actual possibilities for the following event is set to "1" (step E606): it is a case in fact once again of this current entry. The method is then ended at step E608.

If such is the case (output YES of step E604), it is checked whether the maximum number of occurrences (32) has been reached (step E610). Here the extreme cases where the current element can no longer be repeated (maximum number reached) are detected. In the affirmative (output YES), the counter of the actual number of possibilities is decremented by "1" at step E612. Thus account is taken of the fact that this element can no longer be repeated. If the group containing the current entry is a complete group, step E612 is not performed.

In the negative (output NO of step E610) and following E612, it is checked whether the group containing the current entry is a sequence (step E614). This is because the actual number of possibilities for the following event depends on the group containing this entry.

If the group is a sequence (output YES of step E614), the counter of the actual number of possibilities is incremented by the number of possibilities associated with the entry at column 33 in table 20 (step E616).

If the group is not a sequence (output NO of step E614), but the group is a choice, 1 is added to the number of possibilities (step E617), corresponding to the possibility that the current entry is repeated.

If the group is not a sequence (output NO of step E614), but the group is a complete group, the number of entries of the group that have not yet occurred is added to the number of possibilities (step E617). It should be noted that, for the management of the groups of the complete type, the algorithm described by FIGS. 11 and 12 stores the occurrence of each of the entries of the group by means of a table of Boolean values. This table makes it possible to calculate here the number of entries of the group that have not yet occurred.

Following steps E616 and E617, it is checked whether the end of the group can be reached. This is because, in this case, other possibilities can be added. If the group is a sequence, this check is made by means of the value of the column 34 associated with the current entry (step E618). If the group is a choice, this check is always positive. If the group is a complete group, this check consists of ensuring that all the entries of the group have already occurred. In the negative (output NO of step E618), the processing ends (step E608).

In the affirmative (output YES of step E618), if the minimum number of occurrences of the current group has been reached by the second current counter (step test E620), the counter of the actual number of possibilities is incremented, at step E622, by the number of possibilities after the group (column 37).

Then, if the maximum number of occurrences of the current group has not been reached by the second counter (test at step E624), the counter of the actual number of possibilities is incremented, at step E626, by the number of possibilities in the group (column 36).

However, in such a case for a group of the sequence type, it is possible that certain entries in a group may be counted twice: a first time in the number of possibilities corresponding directly to the current entry (step E616) and a second time in the number of possibilities for the start of the group (step E626). To avoid this double counting, the value corresponding to the index of the entry is used (column 35).

The value added to the actual number of possibilities by step E626 in the case of a group of the sequence type depends on the index of the entry considered within the group. If this index is not given or zero, then the number of possibilities in the group is added (column 36).

If this index is non-zero, then this index minus 1 is added (column 35).

It should be noted that the entry in question can be either the current entry (during the first iteration of steps E620 to E630), or be a group contained in the current group (during following iterations of steps E620 to E630).

In addition, if, from the end of this current group, the end of its immediately parent group can be reached (test at step E628, by virtue of the indication 34 stored in the end-of-group entry, for example 26), the possibilities associated with this parent group are also added to the counter, To do this, the parent group becomes the current group at step E630, the entry in question is the start of the old current group and step E620 is returned to, where it is also checked that the end of the current parent group can be reached (by means of column 34).

In the negative at step E628, the processing ends at step E608.

Thus, by way of example, for the entry "SE (paragraph)" of the group of the sequence type corresponding to entries 21 and 29, if an occurrence of this entry has already been encountered, then the actual number of possibilities is equal to:

the number of possibilities associated with the entry (step E616), that is to say 2, increased by the number of possibilities after the group (step E622 since the sequence "person" has a minimum number of occurrences equal to 1, and therefore necessarily reached), that is to say 1, increased by the number of possibilities in the content of the group (step E626 since the sequence "person" has an infinite maximum number of occurrences), that is to say 1.

In total, there are therefore four actual possibilities, which corresponds to the dictionary of structures "document_3" (FIG. 7), which is the following dictionary selected after the coding/decoding of the element "SE (paragraph)".

If the current entry is a start of group (output NO of step E602), it is checked whether the minimum number of occurrences for this group has been reached or if the group is traversable (test at step E632).

In the affirmative, the counter of the actual number of possibilities is incremented by the number of possibilities after this group (column 37), at step E634.

In the negative and following step E634, it is checked whether the maximum number of occurrences for this group has been reached (test at step E636).

In the negative at step E636, the counter of the actual possibilities is incremented by the number of possibilities for this group (column 36) at step E638.

In the affirmative at step E636 and following step E638, it is checked, at step E640, whether the minimum number of occurrences for this group has been reached and whether the end of the parent group can be reached from the end of this group, in particular by means of the indication at column 34 of the entry corresponding to the end of the current group (for example the entry 26 for the choice group).

In this case (output YES at step E640), step E630 is passed to so as to count, during steps E622 and E626, the possibilities associated with the "parent" groups.

The processing ends at step E608 if the test at step E640 is negative.

Thus, for the entry "Start choice" 23, if no occurrence of this group has already been encountered, then the actual number of possibilities is equal to:

the number 37 of possibilities after the group (step E634 since the group is traversable as indicated at column 38), that is to say 1, increased by the number 36 of possibilities of the group (step E638) that is to say 2.

In total, there are therefore 3 possibilities corresponding to the dictionary of structures "document_1" (FIG. 7). If an occurrence of the choice group has already been encountered, then the number of possibilities is equal to the number 37 of possibilities after the group (step E634), that is to say 1.

It should be noted that, in order to determine all the entries corresponding to the possibilities that can actually be reached (rather than only the number of these possibilities), this same algorithm is used, considering the entries in their order of appearance in the table. It is thus possible to identify the position of the entry obtained at step E520 below, among all the possibilities, so as to have available the associated coding value. It will however be ensured that these two operations are conducted together in order to limit the number of operations.

Returning to FIG. 11, the actual number of possibilities of following events for the current entry is available at the output of step E510.

Step E520 is continued to, coding or decoding the event in question. This step is similar to step E220.

Next, at step E530, it is checked whether other events describing the content of the current element are to be coded or decoded. This step consists of checking whether the last coded or decoded event is an "end of element" event "EE" or not.

If such is the case (output NO indicating that it is an EE event), the coding or decoding of the current element ends at step E550.

If such is not the case (output YES at step E530), the processing continues at step E540 by updating the current parameters used, after which the processing returns to step E510.

For updating current parameters, the current entry becomes the one corresponding to the last event coded or decoded, that is to say the last entry used.

In addition, the first counter of the number of occurrences of the last event is updated: it is incremented by "1" if the current entry has not changed, and is equal to "1" if the current entry has changed.

For each group containing the new current entry, but not containing the previous current entry, the second counter or counters of the number of occurrences corresponding to this group or groups is or are initialized to "1". In addition, if the maximum number of occurrences for this new current entry is reached, then the new current entry is the following entry in the table 20 and the number of occurrences of the last event is reset to zero.

If the new current entry is the end of a group, and its maximum number of occurrences is not reached, then the "second" counter of the number of occurrences of this group is incremented by "1".

Otherwise, if the maximum number of occurrences of this group is reached, the current entry becomes the following entry, the counting of the number of occurrences of this group is eliminated, and the verification of the end of group is once again performed.

If, finally, the current entry is the end of a group, the current entry becomes the entry corresponding to the start of this same group.

As illustrated above, the present invention makes it possible to configure an encoder or decoder by means of a table 20 containing a reduced number of items of information compared with the structure dictionaries of the prior art. In addition, this information is sufficient to enable the encoder or decoder to perform the encoding or decoding operations at low cost.

In particular the invention makes it possible to effect a partial and temporary construction of the structure dictionaries so as to reduce the resources necessary for the processing. Thus the invention can easily be implemented in electronic equipment having limited resources, for example a photographic apparatus or a personal digital assistant.

As mentioned during the "general" description in relation to FIGS. 6 to 12, the method of FIG. 4 can also be used to create tables 20 describing the content of several elements, including nested elements.

Likewise the processing operations in FIG. 5 can be used to code or decode the content of several elements, in particular recursively in order to code or decode the content of nested elements. This usage corresponds to the coding or decoding method used by the EXI format for the nested elements.

Moreover, as also mentioned quickly above, the present invention applies to the cases where elements comprise attributes. In this case, it suffices to consider that the content of the element is a sequence of attributes and sub-elements (the latter therefore forming a sub-group). When attributes are added in the table 20, it is however necessary to sort them in advance according to the lexicographical order defined by the EXI specification in order to determine without error the associated correct coding value.

Likewise, the processing operations described can be adapted to the cases of elements able to contain text. In this case, during step E210 or step E510 the number of possibilities is increased by 1. The last possibility, or the penultimate if an end-of-element event "EE" may occur, in the order to be considered for determining the associated coding value, corresponds to an event of the text content type.

If the taking into account of the text content is combined with the taking into account of attributes, the number of possibilities is increased by 1 only when an event of the text type is enabled, that is to say when all the obligatory attributes have already been coded or decoded.

Moreover, these processing operations are also adapted to the case where deviations with respect to the XML Schema are accepted (mechanism defined in the EXI specification according to which items not corresponding the XML Schema may nevertheless be coded using generic entries and a self-descriptive coding). In such a case, the calculation of the number of possibilities performed during step E210 or step E510 is modified to take into account the entries added to make it possible to code or decode these deviations. These added entries are those defined in the EXI specification.

The simple case above of FIG. 4 and FIG. 5 has been illustrated by means of a group of the sequence type. The corresponding processing operations are nevertheless also adapted when the content of the element is a choice between a set of elements.

In this case, the calculation of the possibilities made by the algorithm in FIG. 4 is modified. First of all, an entry is added before the choice group, in order to represent the start of this group and all the possibilities that it contains. For this entry, the number of possibilities stored in the table 20 at the field 36 is the number of choices contained in the group. For the other entries corresponding to each of the choices, the number of possibilities stored in the table 20 is 1, for example in the field 33 (not filled in in FIG. 8c).

Moreover, step E210 of calculating the number of possibilities is slightly modified:

when no event corresponding to one of the elements contained in the choice has been coded or decoded, the current entry is the one corresponding to the start of the choice group. The number of possibilities is equal to the one stored in the table 20, which corresponds to the number of elements contained in the choice. This number is increased by 1 if it is possible to directly terminate the element that is the subject of the description by the table 20 (that is to say the "end of element" event "EE" is a possibility);

when at least one event corresponding to one of the elements contained in the choice has already been coded or decoded, the number of possibilities is calculated from the number (field 33) stored in the table 20. This number is modified according to certain conditions;

if the event can no longer be repeated since its maximum number of occurrences has been reached, then the number of possibilities is decreased by 1;

if the group can be repeated because of the maximum number of occurrences of the choice not having been reached, the number of possibilities is then increased by a value corresponding to the number of elements in the group;

if the end of the element described can be reached since the minimum number of occurrences of the element corresponding to the event has been reached and the minimum number of occurrences of the choice has been reached, then a possibility is added;

if a text content can appear since the element described has a mixed content, then a possibility is also added.

Thus, in order to calculate the number of possibilities in this case, it is checked whether each of the possibilities described is achievable. Each of these possibilities modifies the number of possibilities stored in the table 20. However, the first and second possibilities are exclusive: if the second possibility is achievable, the first is not taken into account.

It can be noted that a content of the choice type easily adapts to the presence of attributes: all the attributes are processed as a sequence. When the obligatory attributes have all been coded or decoded, then the number of possibilities must take into account those corresponding to the content of the choice.

Figure 13:
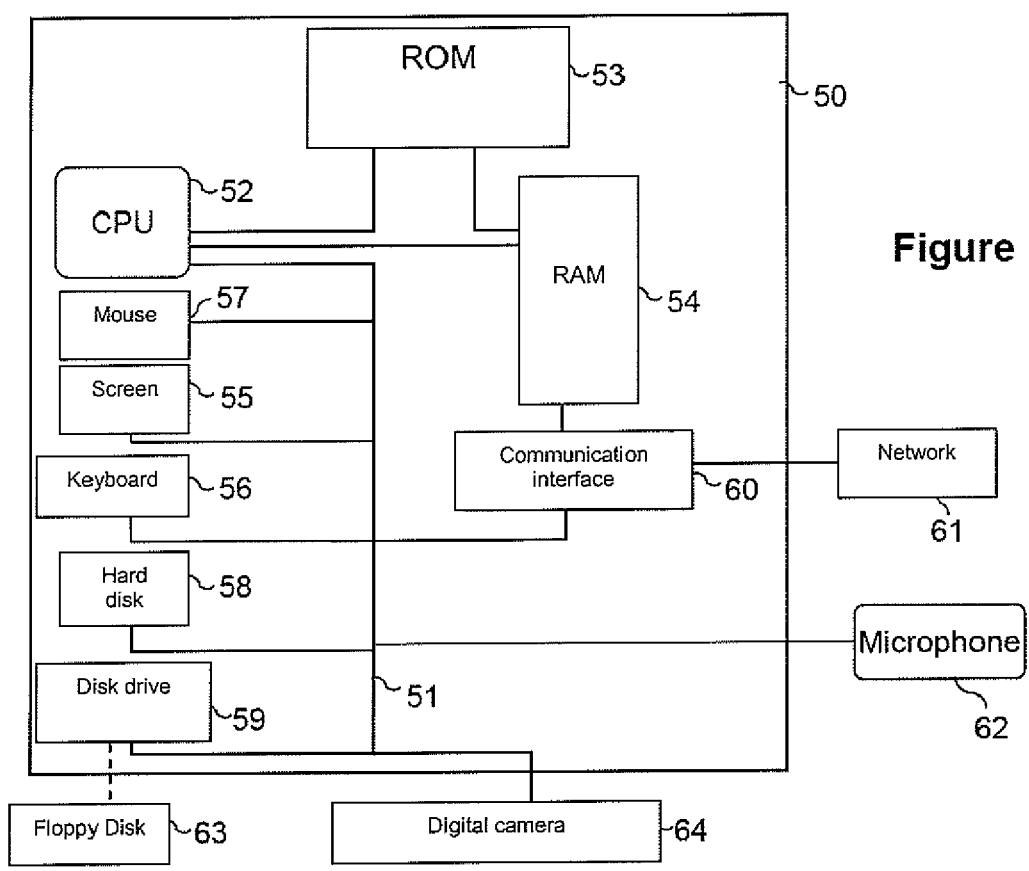
FIG. 13 shows a particular hardware configuration of a device able to implement the method according to the invention.

With reference to FIG. 13, a particular hardware configuration of a device for coding or decoding a structured document suitable for implementation of the method according to the invention is now described by way of example.

An information processing device implementing the invention is for example a microcomputer 50, a workstation, a personal assistant, or a mobile telephone connected to various peripherals. According to yet another embodiment of the invention, the information processing device is in the form of a photographic apparatus provided with a communication interface for allowing connection to a network.

The peripherals connected to the information processing device comprise for example a digital camera 64, or a scanner or any other image acquisition or storage means, connected to an input/output card (not shown) and supplying multimedia data to the information processing device, possibly in the form of XML documents.

The device 50 comprises a communication bus 51 to which there are connected:

a central processing unit CPU 52 for example in the form of a microprocessor;

a read only memory 53 in which the programs whose execution allows implementation of the method according to the invention can be contained;

a random access memory 54 which, after the device 50 is powered up, contains the executable code of the programs of the invention necessary for implementing the invention;

a screen 55 for displaying data and/or serving as a graphical interface with a user, who can thus interact with the programs of the invention, by means of a keyboard 56 or any other means such as a pointing device, such as for example a mouse 57 or an optical pen;

a hard disk 58 or a storage memory, such as a memory of the flash compact type, able to contain the programs of the invention as well as data used or produced during the implementation of the invention;

an optional disk drive 59, or other removable data medium reader, adapted to receive a floppy disk 63 and to read/write thereon data processed or to be processed in accordance with the invention; and a communication interface 60 connected to the telecommunications network 61, the interface 60 being able to transmit and receive data.

In the case of audio data, the device 50 is preferably equipped with an input/output card (not shown) connected to a microphone 62.

The communication bus 51 allows communication and interoperability between the various elements included in the device 50 or connected thereto. The representation of the bus 51 is not limitative and in particular the central unit 52 is able to communicate instructions to any element of the device 50 directly or by means of another element of the device 50.

The floppy disk 63 can be replaced by any information carrier such as for example a compact disk (CD-ROM), rewritable or not, a ZIP disk or a memory card. In general terms, an information storage means, able to be read by a microcomputer or a microprocessor, integrated or not in the device for coding or decoding a structured document, possibly removable, is adapted to store one or more programs whose execution enables the method according to the invention to be implemented.

The executable code enabling the device for coding or decoding a structured document to implement the invention can be stored either in read only memory 53, or on the hard disk 58 or on a removable digital medium such as for example a floppy disk 63 as described previously. According to a variant, the executable code of the programs is received by means of the telecommunication network 61, via the interface 60, in order to be stored in one of the storage means of the device 50 (such as the hard disk 58 for example) before being executed.

The central unit 52 controls and directs the execution of the instructions or portions of software code of the program or programs of the invention, instructions or portions of software code being stored in one of the aforementioned storage means. When the device 50 is powered up, the program or programs that are stored in a non-volatile memory, for example the hard disk 58 or read only memory 53, are transferred into the random access memory 54, which then contains the executable code of the program or programs of the invention, as well as registers for storing the variables and parameters necessary for implementing the invention.

It should also be noted that the device implementing the invention or incorporating it can also be implemented in the form of a programmed apparatus. For example, such a device can then contain the code of the computer program or programs in fixed form in an application specific integrated circuit (ASIC).

The device described here and in particular the central unit 52 are able to implement all or some of the processing operations described in relation to FIGS. 3 to 6 and 8 to 12 in order to implement the method that is the object of the present invention and constitute the device that is the object of the present invention.

The above examples are only embodiments of the invention, which is not limited thereby.

In particular, although the above description presents processing operations performed on a fragment of XML Schema 1 corresponding to an element, it also applies to an entire XML Schema. It should however be noted that an element-by-element processing is well adapted to a coding as described in the EXI specification, where the elements are processed one by one according to their organization.

The invention claimed is:

1. A method of coding or decoding a structured document, the method comprising:
   (i) configuring an encoder or decoder including obtaining data describing a plurality of items of a document structure model and storing the data as a plurality of recordings to be used by the encoder or decoder for coding or decoding a plurality of corresponding items of a structured document,
   wherein each of the recordings is associated with a different one of the items of the document structure model and includes, for each said different item of the document structure model:
   minimum and maximum numbers of occurrences of said different item, and
   a number of possible types of item liable to occur after one of the occurrences of said different item, said number being calculated according to the document structure model, and
   wherein the recordings are stored in an order of appearance of associated items within the data describing the document structure model; and
   (ii) determining a possible item able to succeed a given item that is furthest away from the given item in the order of appearance within the data describing the document structure model, and
   for an item following the given item, the number of possible types of item is calculated based on a number of items separating the item following the given item and the possible item that is furthest away from the given item.

2. The method according to claim 1, wherein the number of possible types of item for at least one item is calculated using the minimum numbers of occurrences of two or more of the recordings of two or more items other than the at least one item.

3. The method according to claim 1, wherein the number of possible types of item of each recording indicates a theoretical number of possible types of item, according to the document structure model, in a case where the minimum number of occurrences of the item of the recording has been reached and the maximum number of occurrences of the item of the recording has not been reached.

4. The method according to claim 3, further comprising calculating an actual number of possible types of item for a current item preceding an item to be coded or decoded, the actual number being calculated from the theoretical number of possible types of item of a recording associated with the current item and a current number of successive occurrences of the current item in the document to be coded or decoded.

5. The method according to claim 4, further comprising, during the calculating of the actual number of possible types of item, adjusting the actual number of possible types of item based on a presence of text values or items not described by the document structure model.

6. The method according to claim 4, further comprising calculating coding or decoding information for coding or decoding an item, based on the number of possible types of item associated with the current item preceding the item to be coded or decoded.

7. The method according to claim 6, wherein a number of bits of the coding information is determined based on the actual number of possible types of item.

8. The method according to claim 1, wherein the data obtained are stored in the form of a single recording for each item of the structure model.

9. The method according to claim 1, wherein the data describing the document structure model describe at least one group of items within which at least one other group of items is nested, a group of items describing a structure of the items constituting an element,
   and at least one of the recordings is associated with each group of items and gives information on the minimum and maximum numbers of occurrences of the group as defined by the document structure model.

10. The method according to claim 9, wherein at least one recording associated with a group gives information on the number of possible types of item able to succeed in the group and, according to the document structure model, an item preceding the group or an item in the group, the group being iterated.

11. The method according to claim 9, wherein at least one recording associated with a group gives information on the number of possible types of item able to succeed within the group and, according to the structure model, an item of the group.

12. The method according to claim 9, wherein at least one recording associated with a group gives information on whether all the items in the group are optional.

13. The method according to claim 9, wherein a recording of each item in a first group and the at least one recording associated with a group nested in the first group comprise an end-of-group indication indicating whether an item external to the first group is a possible item for succeeding the item or the nested group, according to circumstances.

14. The method according to claim 9, wherein a recording of each item comprises the number of possible types of item, able to succeed, according to the document structure model, within a group including the item, calculation of the number of possible types of item within the group comprising:

running through the data describing the document structure model in the order of appearance of the items corresponding to the group including the item associated with the recording, and as long as an item, a group or all the items in a group are optional when running through, incrementing a counter of the number of possible types of item by 1 or increasing the counter by a number of possible types of item within the group, according to circumstances.

15. The method according to claim 9, further comprising calculating an actual number of possible types of item for a current item preceding an item to be coded or decoded, which depends on:

the minimum and maximum numbers of occurrences, the number of possible types of item within the group and an end-of-group indication, associated with the current item, and the minimum and maximum numbers of occurrences, the numbers of possible types of item able to succeed an item within the group or after the group, and the end-of-group indication, for the groups nesting the current item.

16. A device for coding or decoding a structured document, the device comprising:

(i) a configuration unit configured to obtain data describing a plurality of items of a document structure model and to store the data as a plurality of recordings to be used by the device for coding or decoding a plurality of corresponding items of a structured document, wherein each recording is associated with a different one of the items of the document structure model and includes, for each different item of the document structure model:

minimum and maximum numbers of occurrences of said different item, and a number of possible types of item liable to occur after one of the occurrences of said different item, said number being calculated according to the document structure model, and wherein the recordings are stored in an order of appearance of associated items within the data describing the document structure model; and (ii) a determination unit configured to determine a possible item able to succeed a given item that is furthest away from the given item in the order of appearance within the data describing the document structure model, and for an item following the given item, the number of possible types of item is calculated based on a number of items separating the item following the given item and the possible item that is furthest away from the given item.

17. A non-transitory computer-readable storage medium storing instructions that, when executed by a computer, cause the computer to:

(i) configure an encoder or decoder including obtaining data describing a plurality of items of a document structure model and storing the data as a plurality of recordings to be used by the encoder or decoder for coding or decoding a plurality of corresponding items of a structured document, wherein each of the recordings is associated with a different one of the items of the document structure model and includes, for each said different item of the document structure model:

minimum and maximum numbers of occurrences of said different item, and a number of possible types of item liable to occur after one of the occurrences of said different item, said number being calculated according to the document structure model, and wherein the recordings are stored in an order of appearance of associated items within the data describing the document structure model; and (ii) determine a possible item able to succeed a given item that is furthest away from the given item in the order of appearance within the data describing the document structure model, and for an item following the given item, the number of possible types of item is calculated based on a number of items separating the item following the given item and the possible item that is furthest away from the given item.

* * * * *